United States Patent
Wilton et al.

(10) Patent No.: US 8,449,423 B2
(45) Date of Patent: May 28, 2013

(54) SELECTABLE ONE-WAY CLUTCH WITH BREAKAWAY FEATURE

(75) Inventors: Daryl A. Wilton, Macomb, MI (US); James M. Hart, Belleville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 309 days.

(21) Appl. No.: 12/943,590

(22) Filed: Nov. 10, 2010

(65) Prior Publication Data

US 2012/0115663 A1  May 10, 2012

(51) Int. Cl.
*F16H 31/00* (2006.01)
*F16H 3/44* (2006.01)
*F16D 11/06* (2006.01)
*F16D 47/04* (2006.01)
*F16D 43/28* (2006.01)

(52) U.S. Cl.
USPC ......... 475/144; 475/318; 192/43.1; 192/48.3; 192/85.18; 192/85.21

(58) Field of Classification Search
USPC ................ 192/85.26, 48.619, 48.3; 475/144, 475/148, 318
See application file for complete search history.

(56) References Cited

U.S. PATENT DOCUMENTS

| | | | | |
|---|---|---|---|---|
| 4,890,512 A * | 1/1990 | Kano et al. | ..... | 475/144 |
| 5,638,933 A * | 6/1997 | Matsumoto et al. | ..... | 192/52.5 |
| 6,277,047 B1 * | 8/2001 | Sato et al. | ..... | 475/148 |
| 2008/0110715 A1 * | 5/2008 | Pawley | ..... | 192/43.1 |

* cited by examiner

*Primary Examiner* — Edwin A Young

(57) ABSTRACT

A selectable overrunning clutch and breakaway, i.e., energy absorbing, cone clutch is disposed in series between two elements of a planetary gear automatic transmission. An annular piston is received within a complementary cylinder and includes a male cone clutch member that mates with a stationary female cone clutch member. Also carried by the annular piston is an annular drive ring which engages a planetary gear assembly element such as a ring gear. Disposed between the drive ring and the piston is a selection ring having a plurality of circumferential apertures or ports that receive a like plurality of struts. The face of the annular piston includes pockets or recesses that receive the struts and the face of the drive ring includes notches or surfaces against which the struts engage. Tangentially disposed in the annular piston is a small selection piston which rotates the selection ring between two positions to either allow overrunning in one direction between the annular piston and the annular drive ring or lock the two components together.

20 Claims, 2 Drawing Sheets

SELECTABLE ONE-WAY CLUTCH WITH BREAKAWAY FEATURE

FIELD

The present disclosure relates to clutch assemblies for motor vehicle automatic transmissions and more particularly to clutch assemblies for motor vehicle automatic transmissions having a selectable one-way clutch and cone clutch and with a breakaway feature.

BACKGROUND

The statements in this section merely provide background information related to the present disclosure and may or may not constitute prior art.

Current motor vehicle automatic transmissions commonly include two or more planetary gear assemblies disposed in tandem and a plurality of clutches and brakes that selectively connect or ground various elements of the planetary gear assemblies to provide forward and reverse gears. The clutches are generally multiple plate friction packs actuated by a hydraulic piston.

While such clutch configurations have proved their worth, they do exhibit relatively significant spin (frictional) losses when disengaged due to their multiple interleaved plates, one set of which may be rotating while the other may be stationary.

In certain applications, accordingly, it may be appropriate to connect the transmission elements with other, lower loss clutch configurations. The present invention is so directed.

SUMMARY

The present invention provides a selectable overrunning clutch and breakaway, i.e., energy absorbing, cone clutch disposed in series between two elements of a planetary gear automatic transmission. An annular piston is received within a complementary cylinder and includes a male cone clutch member that mates with a stationary female cone clutch member. Also carried by the annular piston is an annular drive ring which engages a planetary gear assembly element such as a ring gear. Disposed between the drive ring and the piston is a selection ring having a plurality of circumferential apertures or ports that receive a like plurality of struts. The face of the annular piston includes pockets or recesses that receive the struts and the face of the drive ring includes notches or surfaces against which the struts engage. Tangentially disposed in the annular piston is a small selection piston which rotates the selection ring between two positions to either allow overrunning in one direction between the annular piston and the annular drive ring or lock the two components together.

Thus it is an aspect of the present invention to provide a selectable overrunning clutch and breakaway cone clutch.

It is a further aspect of the present invention to provide a selectable overrunning clutch and breakaway cone clutch disposed in series between two elements of a planetary gear automatic transmission.

It is a still further aspect of the present invention to provide a selectable overrunning clutch and cone clutch having an annular piston received within a complementary cylinder.

It is a still further aspect of the present invention to provide a selectable overrunning clutch and cone clutch having a male cone clutch member that mates with a stationary female cone clutch member.

It is a still further aspect of the present invention to provide a selectable overrunning clutch and cone clutch having an annular drive ring which engages a planetary gear assembly element such as a ring gear.

It is a still further aspect of the present invention to provide a selectable overrunning clutch and cone clutch having a selection ring defining a plurality of circumferential apertures or ports that receive a like plurality of struts.

It is a still further aspect of the present invention to provide a selectable overrunning clutch and cone clutch having an annular piston which includes pockets or recesses that receive struts and a drive ring which includes notches or surfaces against which the struts engage.

It is a still further aspect of the present invention to provide a selectable overrunning clutch and cone clutch including a selection piston which rotates a selection ring between overrunning and locked positions.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. In this regard, the term "breakaway" as utilized herein in connection with the cone clutch means that the clutch is designed, provided and utilized primarily as a safety and energy absorbing device disposed in mechanical series with the selectable overrunning clutch. That is, since an overrunning clutch is essentially incapable of absorbing energy (existing, for example, because of a speed differential across an unsynchronized but engaging clutch), it is disposed in series with the overrunning clutch to act as a torque limiting and energy dissipating device. If excessive torque is applied across the overrunning clutch, the slip threshold of the breakaway cone clutch will be exceeded, the cone clutch will slip and excessive energy that might damage the overrunning clutch will be absorbed and dissipated by the cone clutch.

Furthermore, the inventors are aware of a certain preference to describe a selectable friction coupling element between two rotating members as a "clutch" whereas a selectable friction coupling between a rotating member and a stationary member is described as a "brake." The inventors, however, do not subscribe to this convention and prefer to and herein have referred to selectable friction coupling elements broadly and generally as clutches, e.g., the cone clutch. They have, however, in certain locations in the text, inserted the parenthetical "(brake)" to clarify the description of a selectable friction coupling element disposed between rotating and stationary members and acknowledge the above-noted alternate naming convention.

Figure 1:
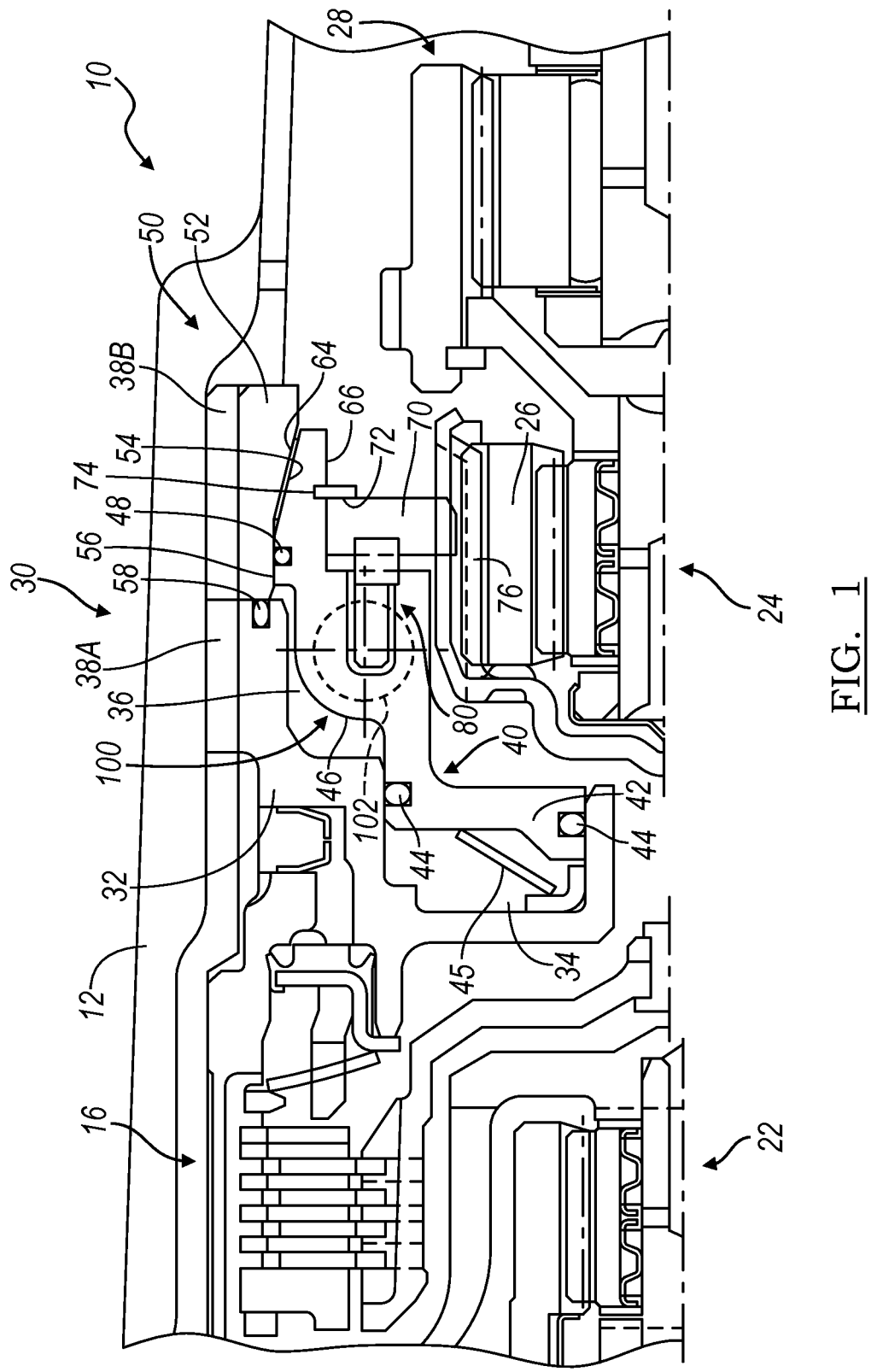
FIG. 1 is a fragmentary, sectional view of a portion of a planetary gear automatic transmission incorporating the present invention.

With reference to FIG. 1, a portion of a planetary gear automatic motor vehicle transmission is illustrated and generally designated by the reference number 10. The automatic transmission 10 includes a stationary metal housing 12 having various openings, flanges and features (not illustrated) which cooperate with certain components of the transmission 10 such as an input shaft, one or more drive quills or tubes and an output shaft (all not illustrated). The automatic transmission 10 also includes a friction clutch 16 and three planetary gear assemblies: a first planetary gear assembly 22, a second planetary gear assembly 24 having a ring gear 26 and a third planetary gear assembly 28.

Physically and operably disposed between the housing 12 and the ring gear 26 of the second planetary gear assembly 24 is a selectable overrunning or one-way clutch and cone clutch (brake) assembly 30 according to the present invention. The overrunning clutch and cone clutch assembly 30 includes a stationary, annular housing 32 defining a first, inner annular cylinder 34 and a second, outer annular cylinder 36. The annular housing 32 may be retained against rotation in the housing 12 by interengaging male and female splines 38A or other suitable means (not illustrated).

Disposed partially within the annular housing 32 is an annular piston assembly 40. The annular piston assembly 40 includes a first, inner surface 42 bounded by a pair of O-ring seals 44 which is received and axially translates within the first annular cylinder 34. A Belleville spring 45 or similar force generating device biases or preloads the annular piston assembly 40 in the direction of applied hydraulic force. The annular piston assembly 40 also includes a second, outer surface 46 and an additional O-ring seal 48 which axially translates within the second, outer annular cylinder 36. The total force generated and exerted by the annular piston assembly 40 is the sum of the axial hydraulic forces on the first, inner surface 42 and the second, outer surface 46.

A cone clutch (brake) assembly 50 resides at the end of the annular piston assembly 40 opposite the first, inner annular cylinder 34. The cone clutch assembly 50 includes an annular outer or female cone clutch member 52 having a first, female frusto-conical clutch surface 54 and a smooth cylindrical surface 56 against which the O-ring 48 seals. The cone clutch member 52 is retained against rotation in the housing 12 by interengaging male and female splines 38B or other suitable means (not illustrated). An O-ring seal 58 which may be disposed in either the cone clutch member 52 or the annular housing 32 (as illustrated) provides a fluid tight seal between the annular housing 32 and the cone clutch member 52.

Facing the first frusto-conical surface 54, the piston assembly 40 includes a complementary second, male frusto-conical surface 64. The piston assembly 40 also includes an adjacent, inner cylindrical surface 66 which receives and radially locates an annular drive ring 70. The annular drive ring 70 is freely rotatably disposed on the inner cylindrical surface 66 and is axially restrained by a snap ring 72 which seats within a circumferential channel or groove 74 in the inner cylindrical surface 66. The annular drive ring 70 may be rotationally coupled to the ring gear 26 of the second planetary gear assembly 24 by an interengaging male and female spline set 76 or similar means.

Figure 2:
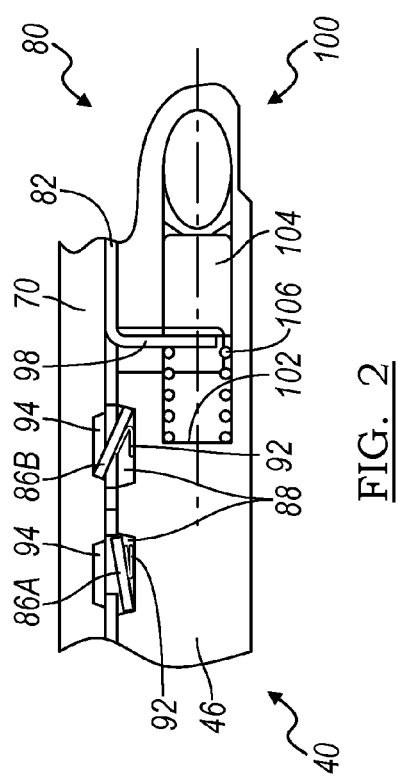
FIG. 2 is a fragmentary, elevational view of a selectable one-way clutch assembly according to the present invention.
Figure 3:
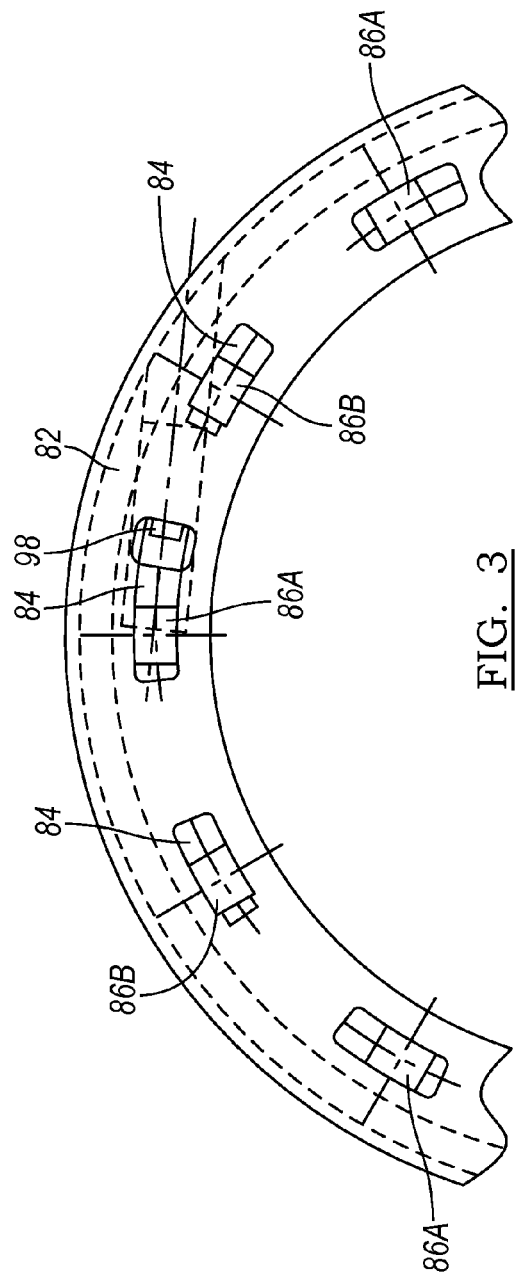
FIG. 3 is a fragmentary, top plan view of a selectable one-way clutch assembly according to the present invention.

Referring now to FIGS. 1, 2 and 3, a selectable one-way or overrunning clutch assembly 80 is disposed between the piston assembly 40 and the annular drive ring 70. The overrunning clutch assembly 80 includes a selection ring 82 having a plurality of circumferentially arranged arcuate slots or apertures 84. Within each slot or aperture 84 is a strut 86A or 86B. The struts 86A and 86B are arranged in alternating sets: every other strut 86A is oriented at a first angle, as illustrated in FIGS. 2 and 3 and the alternating struts 86B are oriented at a distinct, opposite, second angle. The struts 86A and 86B are mounted in recesses 88 in the piston assembly 40 and each is spring biased outwardly by a leaf spring 92 or similar component. The opposite ends of the struts 86A and 86B are received within pockets or recesses 94 in the annular drive ring 70. When the selection ring 82 is moved to a first circumferential position, only the struts 86B may move into the annular drive ring 70 and engage the walls of the pockets or recesses 94, the clutch assembly 80 thereby functioning as a conventional one-way or overrunning clutch. When the selection ring 82 is moved to a second circumferential position, both the struts 86A and 86B engage the walls of the pockets or recesses 94 and the clutch assembly 80 locks up and transfers torque directly through it in both directions.

The selection ring 82 also includes a tang or lug 98 that is acted upon by a tangentially arranged selection ring piston and cylinder or actuator assembly 100. The selection ring actuator assembly 100 includes a cylinder 102 which slidingly receives a selection ring piston 104. The selection ring piston 104 engages the tang or lug 98 on the selection ring 82 and, when hydraulic pressure is applied to the face of the selection ring piston 104, rotates the selection ring 82 from the first position described above, to a second position, also described above. The hydraulic fluid supply is common to the second, outer cylinder 36 of the annular housing 32 and the cylinder 102. Thus, an increase in hydraulic pressure which translates the selection ring piston 104 and rotates the selection ring 82, will also increase the force on and the slip point of the cone clutch assembly 50. A compression spring 106 aligned with the tang or lug 98 and the selection ring piston 104 biases the tang or lug 98 and the selection ring 82 toward the selection ring piston 104 and returns the selection ring 82 to the first position when hydraulic fluid pressure is removed from the face of the selection ring piston 104.

In operation, the belleville spring 45 provides a minimum, preselected torque throughput and slip threshold of the cone clutch assembly 50. An increase in this minimum torque-slip threshold may be achieved by increasing the hydraulic pressure within the first, inner cylinder 34 and against the first, inner surface 42 of the annular piston assembly 40. As explained directly above, to change the state of the one-way clutch assembly 80, pressurized hydraulic fluid is provided to the cylinder 102 of the selection ring piston and cylinder assembly 100 and the piston 104 translates and rotates the selection ring 82. Because the supply to the cylinder 102 and the second, outer cylinder 36 of the housing 32 are common, force against the cone clutch assembly 50 is also increased at this time, increasing its torque throughput and slip threshold.

It should be appreciated that whereas the present invention provides certain benefits with regard to reduced spin losses by virtue of removal/replacement of a friction clutch pack, since the selectable one-way or overrunning clutch assembly 80 is not capable of any significant energy dissipation, it is preferable that the input and output speeds of the assembly 80 be relatively closely matched before engagement. The reason for inclusion of, and the purpose of, the cone clutch assembly 50, however, is to act as an energy absorbing or controlled slip device. That is, should the selectable one-way or overrunning clutch assembly 80 engage or be engaged when there is a speed difference greater than a predetermined speed across it, the cone clutch assembly 50 will slip and absorb energy, thereby avoiding wear or damage to the selectable one-way or overrunning clutch assembly 80.

It should also be appreciated that while the invention including the annular piston assembly 40, the cone clutch assembly 50 and the overrunning clutch assembly 80 are illustrated in FIG. 1 in association with the ring gear 26 of the planetary gear assembly 24, the invention is equally suited and may be utilized with other components of a planetary gear assembly such as a planetary gear carrier or any of the other members or components of an automatic transmission.

The description of the invention is merely exemplary in nature and variations that do not depart from the gist of the invention are intended to be within the scope of the invention band the following claims. Such variations are not to be regarded as a departure from the spirit and scope of the invention.

What is claimed is:

1. A clutch assembly for a transmission comprising, in combination,
    a stationary housing,
    a planetary gear assembly,
    a first hydraulic piston and cylinder assembly having a first cylinder secured to said housing and a first piston,
    a cone clutch having a first friction element secured to said housing and a second friction element secured to said first piston,
    a selectable overrunning clutch having a plurality of struts disposed in said first piston, a selection ring having a plurality of apertures for said struts and a drive ring coupled to an element of said planetary gear assembly and having a plurality of recesses for engagement by said struts, and
    a second hydraulic piston and cylinder assembly disposed in said first piston and having a second piston coupled to said selection ring.

2. The clutch assembly of claim 1 wherein a first portion of said struts are oriented at a first angle and a second portion of said struts are oriented at a second angle distinct from said first angle.

3. The clutch assembly of claim 1 further including a preload spring for biasing said second friction element toward said first friction element.

4. The clutch assembly of claim 1 wherein said second hydraulic piston and cylinder assembly is oriented tangentially in said first piston.

5. The clutch assembly of claim 1 further including seals disposed in said first piston and engaging said first cylinder.

6. The clutch assembly of claim 1 wherein said selection ring includes a tang engaged by said second piston and said element of said planetary gear assembly is a ring gear.

7. The clutch assembly of claim 1 wherein said second piston is moveable between two positions and said selectable overrunning clutch is locked in one of said two positions and overruns in one direction in another of said two positions.

8. An overrunning and cone clutch assembly for a transmission comprising, in combination,
    a stationary member,
    a first hydraulic piston and cylinder assembly having a first cylinder secured to said stationary member and a first piston,
    a cone clutch having a first friction element secured to said stationary member and a second friction element secured to said first piston,
    an overrunning clutch having a plurality of struts disposed in first recesses in said first piston, a selection ring having a plurality of apertures for said struts and a drive ring having a plurality of second recesses for engagement by said struts, and
    a second hydraulic piston disposed tangentially in said first piston and engaging said selection ring.

9. The overrunning and cone clutch assembly of claim 8 wherein said stationary member is coupled to a housing of said transmission.

10. The overrunning and cone clutch assembly of claim 8 wherein a first portion of said struts are disposed at a first angle and a second portion of said struts are disposed at a second angle distinct from said first angle.

11. The overrunning and cone clutch assembly of claim 8 further including a belleville spring for providing a preload to said first piston and said cone clutch.

12. The overrunning and cone clutch assembly of claim 8 further including a compression spring biasing said second hydraulic piston against hydraulic fluid pressure.

13. The overrunning and cone clutch assembly of claim 8 further including springs for biasing said struts into said second recesses.

14. The overrunning and cone clutch assembly of claim 8 whereby increasing fluid pressure on said second piston increases torque capacity of said cone clutch.

15. An overrunning clutch assembly for a motor vehicle transmission comprising, in combination,
    a planetary gear assembly having a rotating member,
    a first annular clutch member having a tangential piston and cylinder assembly and defining a first plurality of recesses on a first face,
    a second annular clutch member adjacent said first annular clutch member and coupled to said rotating member, said second annular clutch member defining a second plurality of recesses on a second face,
    an overrunning clutch having a plurality of struts, a selection ring disposed between said first and said second faces and having a plurality of apertures for receiving said struts and a member engaged by said tangential piston,
    whereby translation of said tangential piston and rotation of said selection ring locks and releases said overrunning clutch assembly.

16. The overrunning clutch assembly of claim 15 further including a cone clutch assembly operably disposed between said first annular clutch member and a stationary housing of said transmission.

17. The overrunning clutch assembly of claim 16 further including means for preloading said cone clutch assembly.

18. The overrunning clutch assembly of claim 15 wherein said first annular clutch member includes a first frusto-conical friction surface of a cone clutch assembly and further including a stationary member having a second frusto-conical friction surface of said cone clutch assembly.

19. The overrunning clutch assembly of claim 15 further including springs for biasing said struts into engaged positions within said second recesses on said second face.

20. The overrunning clutch assembly of claim 15 further including a return spring biasing said tangential piston against hydraulic fluid force.

* * * * *